(12) United States Patent
Sagisaka et al.

(10) Patent No.: US 9,101,894 B2
(45) Date of Patent: Aug. 11, 2015

(54) SURFACTANT FOR STABILIZING WATER/SUPERCRITICAL CARBON DIOXIDE MICROEMULSION

(71) Applicants: NISSAN CHEMICAL INDUSTRIES, LTD., Tokyo (JP); HIROSAKI UNIVERSITY, Hirosaki-shi, Aomori (JP)

(72) Inventors: Masanobu Sagisaka, Hirosaki (JP); Kotaro Kudo, Hirosaki (JP); Masahiro Hida, Funabashi (JP); Yasufumi Shikauchi, Funabashi (JP)

(73) Assignees: NISSAN CHEMICAL INDUSTRIES, LTD., Tokyo (JP); HIROSAKI UNIVERSITY, Hirosaki-shi (JP)

( * ) Notice: Subject to any disclaimer, the term of this patent is extended or adjusted under 35 U.S.C. 154(b) by 0 days.

(21) Appl. No.: 14/309,160

(22) Filed: Jun. 19, 2014

(65) Prior Publication Data

US 2014/0303062 A1    Oct. 9, 2014

Related U.S. Application Data

(62) Division of application No. 13/582,580, filed as application No. PCT/JP2011/054620 on Mar. 1, 2011, now abandoned.

(30) Foreign Application Priority Data

Mar. 4, 2010  (JP) ................................. 2010-048373

(51) Int. Cl.
C01B 31/20       (2006.01)
B01F 17/00       (2006.01)

(52) U.S. Cl.
CPC ............. B01F 17/0057 (2013.01); C01B 31/20 (2013.01)

(58) Field of Classification Search
CPC ............................. B01F 17/0057; C01B 31/20
See application file for complete search history.

(56) References Cited

U.S. PATENT DOCUMENTS 2,654,772 A    10/1953  Pavlic et al.
6,060,443 A     5/2000  Cripe et al.
7,811,473 B2 * 10/2010  Nagai et al. .................. 252/364
8,815,957 B2 *  8/2014  Sagisaka et al. ................. 516/9
2006/0258798 A1  11/2006  Richard et al.
2013/0023687 A1   1/2013  Sagisaka et al.

FOREIGN PATENT DOCUMENTS

EP    0 401 642 A1   12/1990
JP    A-57-62213      4/1982
JP    A-4-505916     10/1992
JP    A-2004-315675  11/2004
JP    A-2006-524566  11/2006

OTHER PUBLICATIONS

Dupont (Langmuir, vol. 20, No. 23, 2004; pp. 9960-9967 and SI p. 1-24).*
Surface, 2002, vol. 40, No. 10, pp. 9-23 (with English Abstract).
Adschiri, Tadafumi, "Supercritical fluid and nano technology, Chapter 3, section 5, Microemulsion and nanomaterial," CMC Publishing Co., Ltd., 2004, pp. 108-125 (with English Abstract).
Ryoo, Won et al., "Water-in-Carbon Dioxide Microemulsions with Methylated Branched Hydrocarbon Surfactants," Ind. Eng. Chem. Res., 2003, vol. 42, pp. 6348-6358.
Sagisaka, Masanobu, "Preparation and Application of Organic Solvent-Free Supercritical Carbon Dioxide Mieroemulsions," Journal of the Japan Society of Colour Material, 2010, vol. 83, No. 2, pp. 66-75.
Ryoo, Won et al., "Electrostatic Stabilization of Colloids in Carbon Dioxide: Electrophoresis and Dielectrophoresis," Langmuir, 2005, vol. 21, pp. 5914-5923.
International Search Report issued in International Patent Application No. PCT/JP2011/054620 mailed Apr. 12, 2011.

* cited by examiner

*Primary Examiner* — Valerie Rodriguez-Garcia
(74) *Attorney, Agent, or Firm* — Oliff PLC

(57) ABSTRACT

There is provided a highly branched hydrocarbon based surfactant for stabilizing a water/supercritical carbon dioxide microemulsion. A surfactant comprising: a sulfate compound of Formula (1):

$$R^1 - OSO_3M \qquad (1)$$

(where $R^1$ is a $C_{6-30}$ hydrocarbon group having a branched chain; and M is a hydrogen atom, an alkali metal, ammonium, a basic amino acid residue, an alkanolamine residue having a $C_{2-3}$ hydroxyalkyl group, or an aliphatic alkanolammonium) for stabilizing a water/supercritical carbon dioxide microemulsion.

6 Claims, 5 Drawing Sheets

SURFACTANT FOR STABILIZING WATER/SUPERCRITICAL CARBON DIOXIDE MICROEMULSION

This application is a divisional application of application Ser. No. 13/582,580, filed Oct. 2, 2012, which in turn is a National Phase of International Application PCT/JP2011/054620, filed Mar. 1, 2011, and which claims priority to Japanese Patent Application No. 2010-048373 filed Mar. 4, 2010. The disclosures of the prior applications is hereby incorporated by reference herein in their entries.

TECHNICAL FIELD

The present invention relates to a surfactant and relates more specifically to a surfactant for stabilizing a water/supercritical carbon dioxide microemulsion.

BACKGROUND ART

The supercritical carbon dioxide (hereinafter, may be expressed as $scCO_2$) refers to a fluid of carbon dioxide formed at the critical temperature (31.1° C.) or higher and under the critical pressure (73.8 bar) or higher, and has characteristics relatively similar to those of a nonpolar solvent such as hexane, so that $scCO_2$ is expected as an environmentally acceptable industrial solvent. For example, a thermodynamically stable $W/scCO_2$ microemulsion (hereinafter, may be expressed as $W/scCO_2\mu E$) in which water (W) or the like is dispersed as nanometer-seized aqueous droplets in $scCO_2$ is expected to be applicable to various fields such as dry-cleaning, extraction of useful components such as metal ions and proteins, and an organic synthesis or a fine particle synthesis by utilization thereof as a reaction field.

For forming $W/scCO_2\mu E$, a surfactant soluble in $scCO_2$ is necessary, so that hitherto, various surfactants have been studied. Among them, it is known that a fluorocarbon compound can be well dissolved in $scCO_2$ (Patent Document 1). However, the fluorocarbon compound is expensive and it is necessary to avoid an excessive use thereof also in terms of the burden to the human body and the environment. Therefore, the development of a hydrocarbon-based surfactant is desired.

As a representative example of a hydrocarbon-based surfactant, AOT (Aerosol-OT [registered trade mark]: sodium bis-2-ethyl-1-hexylsulfosuccinate) is known. However, this surfactant is not suitable as a surfactant for $W/scCO_2\mu E$, and the surfactant is entirely not dissolved in $scCO_2$ or even when the surfactant can form a microemulsion, $W_0^c$ is a maximum of 10 or less (Non-patent Document 1, p. 12, 1.35-41). Here, $W_0^c$ is a value remaining after subtracting an amount (a number of moles) of water capable of being dissolved in carbon dioxide from a molar ratio ($W_0$) of water relative to 1 mole of a surfactant, and is an index for the ability of a surfactant to form a microemulsion in $scCO_2$ (ability of dispersing water). As an effective surfactant for $W/scCO_2\mu E$, TMN-6 (Tergitol [registered trade mark]: polyethylene glycol trimethyl nonyl ether) is known (Non-patent Document 2, p. 112, 1.19-29 or Non-patent Document 3). However, it is a present situation that except the TMN-6, there is reported no effective surfactant among other commercially available hydrocarbon-based surfactants.

RELATED-ART DOCUMENTS

Patent Document

Patent Document 1: Japanese Patent Application Publication No. 2004-315675 (JP 2004-315675 A)

Non-Patent Documents

Non-patent Document 1: Surface, Vol. 40, No. 10, pp. 9-23 (2002)
Non-patent Document 2: supervised by Tadafumi Adschiri, "Supercritical fluid and nano technology, Chapter 3, section 5, Microemulsion and nanomaterial" published by CMC Publishing CO., Ltd. in 2004, August
Non-patent Document 3: Ind. Eng. Chem. Res., Vol. 42, pp. 6348-6358 (2003)

SUMMARY OF THE INVENTION

Problem to be Solved by the Invention

The present invention has been invented in view of such situations and it is an object of the present invention to provide an excellent hydrocarbon-based surfactant for $W/scCO_2\mu E$ having high water dispersing ability.

Means for Solving the Problem

As a result of assiduous research intended to overcome these disadvantages, the inventors of the present invention have found that a sulfate compound having a hydrocarbon group containing a branched chain becomes an excellent surfactant for $W/scCO_2\mu E$ to complete the present invention.

That is, the present invention relates to, as a first aspect, a surfactant containing a sulfate group of Formula (1):

$$R^1\text{—}OSO_3M \quad (1)$$

(where $R^1$ is a $C_{6-30}$ hydrocarbon group having a branched chain; and M is a hydrogen atom, an alkali metal, ammonium, a basic amino acid residue, an alkanolamine residue having a $C_{2-3}$ hydroxyalkyl group, or an aliphatic alkanolammonium) for stabilizing a water/supercritical carbon dioxide microemulsion.

As a second aspect, the present invention relates to the surfactant according to the first aspect, characterized in that $R^1$ is a $C_{12-30}$ hydrocarbon group.

As a third aspect, the present invention relates to the surfactant according to the first aspect, characterized in that $R^1$ is a $C_{12}$-24 hydrocarbon group.

As a fourth aspect, the present invention relates to the surfactant according to the first aspect, characterized in that $R^1$ is any one of groups of Formula (2) to Formula (7):

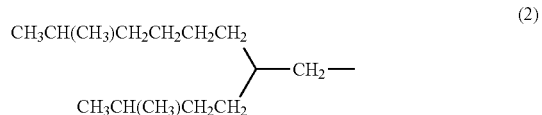

(2)

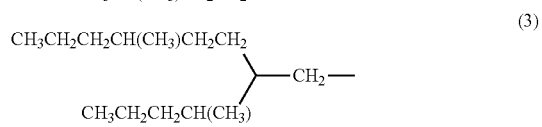

(3)

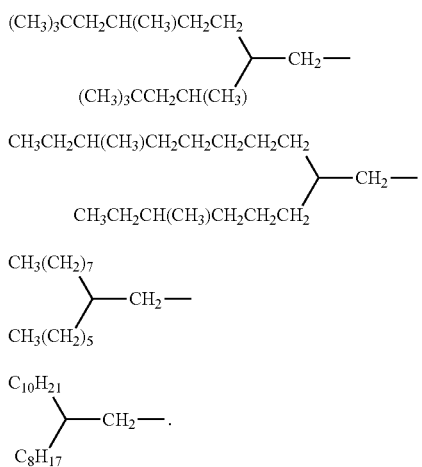

As a fifth aspect, the present invention relates to the surfactant according to the first aspect, characterized in that $R^1$ is a group of Formula (4) above.

As a sixth aspect, the present invention relates to the surfactant according to the first aspect, characterized in that M is an alkali metal.

As a seventh aspect, the present invention relates to a water/supercritical carbon dioxide microemulsion in which the concentration of the surfactant described in the first aspect to the sixth aspect is $10^{-10}$% by mole to $10^2$% by mole based on the number of moles of carbon dioxide.

As an eighth aspect, the present invention relates to a water/supercritical carbon dioxide microemulsion in which an amount of the water (molar ratio ($W_0$)) relative to 1 mole of the surfactant described in the first aspect to the sixth aspect at a temperature of 75° C. under a pressure of 30 MPa is 0.001 to 1,000.

Effect of the Invention

The surfactant of the present invention can remarkably improve the water dispersing ability of the surfactant in comparison with a conventional hydrocarbon-based surfactant for W/scCO$_2$μE. Specifically, the surfactant of the present invention has, in spite of being a hydrocarbon-based surfactant, a water dispersing ability equivalent to or comparable to that of a surfactant of a fluorocarbon compound. Accordingly, the surfactant of the present invention can be suitably used as a surfactant for W/scCO$_2$μE.

In addition, a sulfate compound that is the surfactant of the present invention can be easily synthesized from an industrially easily-obtainable inexpensive raw material rich in versatility simply by a one-step reaction.

Furthermore, the surfactant of the present invention can maintain the effect as the surfactant, even when in the synthesis thereof, an unreacted raw material remains.

MODES FOR CARRYING OUT THE INVENTION

Figure 1:
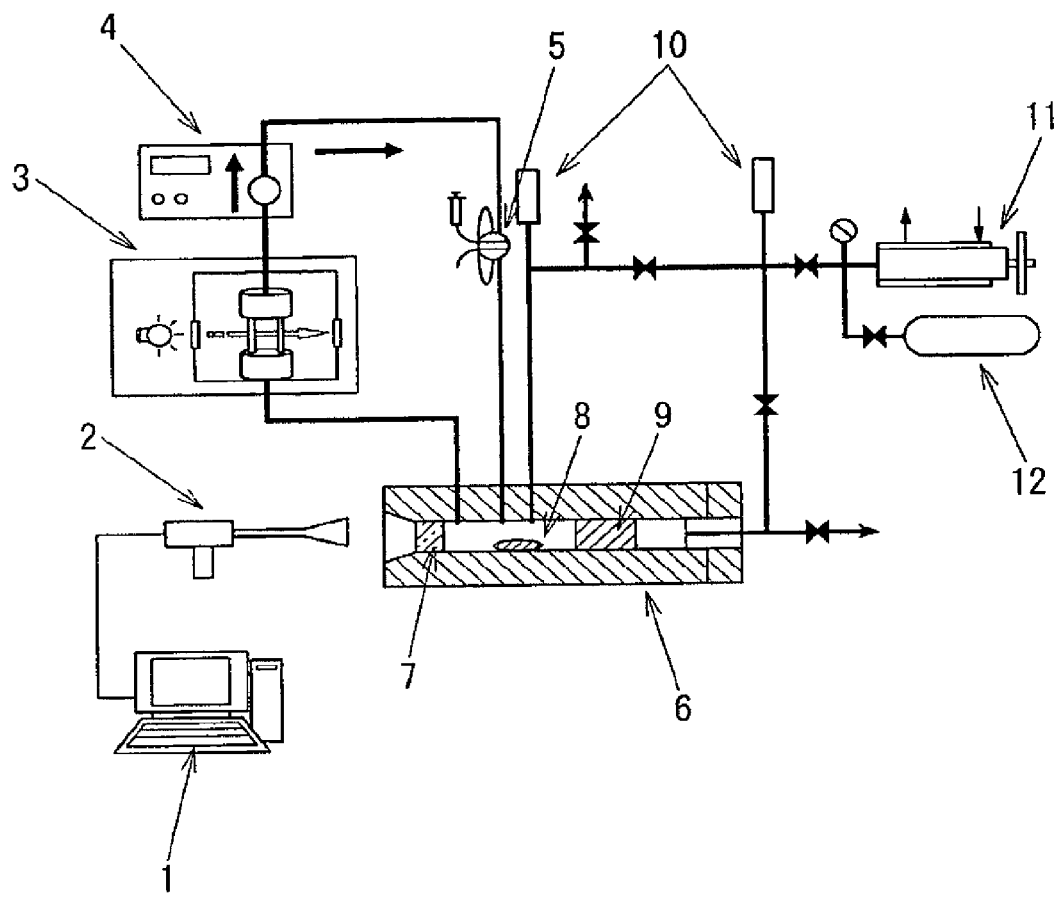
FIG. 1 is a view schematically illustrating an apparatus for observing a phase behavior.

Hereinafter, the present invention is described further in detail.

The present invention is a surfactant containing a sulfate compound of Formula (1):

(where $R^1$ is a $C_{6-30}$ hydrocarbon group having a branched chain; and M is a hydrogen atom, an alkali metal, ammonium, a basic amino acid residue, an alkanolamine residue having a $C_{2-3}$ hydroxyalkyl group, or an aliphatic alkanolammonium) for stabilizing a water/supercritical carbon dioxide microemulsion.

Examples of the $C_{6-30}$ hydrocarbon group having a branched chain include an isohexyl group, an isoheptyl group, an isooctyl group, an isononyl group, an isodecyl group, an isolauryl group, an isopalmityl group, an isomyristyl group, an isostearyl group, and an isoeicosyl group. Among them, preferred are $C_{12-30}$ hydrocarbon groups such as an isomyristyl group, an isopalmityl group, an isostearyl group, and an isoeicosyl group. Further preferred are $C_{12-24}$ hydrocarbon groups such as an isomyristyl group, an isopalmityl group, and an isostearyl group.

$R^1$ is specifically preferably any one of the groups of Formula (2) to Formula (7):

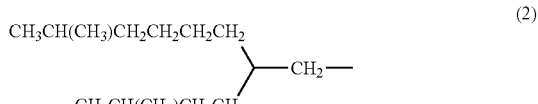

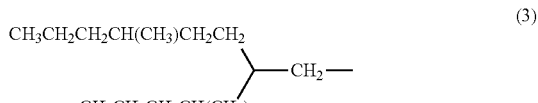

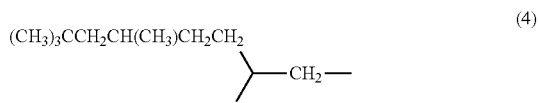

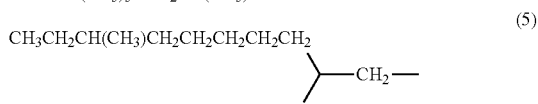

-continued

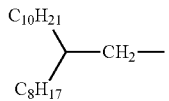 (7)

Examples of the alkali metal include lithium, sodium, and potassium and among them, sodium and potassium are preferred.

Examples of the basic amino acid residue include an arginine residue, a lysine residue, a histidine residue, and an ornithine residue.

Examples of the alkanolamine residue having a $C_{2-3}$ hydroxyalkyl group include a monoethanolamine residue, a diethanolamine residue, and a triethanolamine residue.

Examples of the aliphatic alkanolammonium include 2-amino-2-methyl-1-propanol and 2-amino-2-methyl-1,3-propanediol.

Next, a synthetic method of the sulfate compound in the present invention is described. The sulfate compound in the present invention can be synthesized by a publicly known method. For example, it can be synthesized by a method including: reacting an alcohol having a hydrocarbon group having a branched chain with sulfur trioxide/pyridine in pyridine solvent; and treating the resultant reaction product with a sodium hydrogen carbonate aqueous solution.

As the alcohol having a hydrocarbon group having a branched chain, a commercially available product can be used and specific examples of the commercially available product include FINEOXOCOL 140-N (FO140-N), FINEOXOCOL 1600 (FO-1600), FINEOXOCOL 180 (FO-180), FINEOXOCOL 180-N (FO180-N), and FINEOXOCOL 2000 (FO-2000) (trade names; manufactured by Nissan Chemical Industries, Ltd.).

When the water/supercritical carbon dioxide microemulsion is formed, the concentration of the surfactant of the present invention is usually $10^{-10}$% by mole to $10^{2}$% by mole, or $10^{-9}$% by mole to 10% by mole, or $10^{-8}$% by mole to 1% by mole based on the number of moles of carbon dioxide. The concentration of the surfactant of the present invention may be a minimum concentration (called as cµc) capable of forming the microemulsion or more and for example, when the concentration is lower than $10^{-10}$% by mole, the water/supercritical carbon dioxide microemulsion cannot be formed. On the other hand, the concentration of the surfactant may be an upper limit concentration capable of forming the microemulsion without forming a liquid crystal phase or capable of being dissolved in carbon dioxide, or less and for example, when the concentration is higher than $10^{2}$% by mole, there is such a fear that a liquid crystal phase is formed or the surfactant cannot be dissolved in carbon dioxide to be deposited.

When the water/supercritical carbon dioxide microemulsion is formed, the amount of water (molar ratio of water ($W_0$)) to be added relative to 1 mole of the surfactant of the present invention at a temperature of 75° C. under a pressure of 30 MPa is usually 0.001 to 1,000, or 0.005 to 500, or 0.01 to 200.

The action mechanism of the surfactant of the present invention in W/scCO$_2$µE, particularly, the reason why the surfactant of the present invention has a water dispersing ability equivalent to or comparable to that of a surfactant of a fluorocarbon compound in W/scCO$_2$µE, is not completely elucidated. However, it can be deduced as follows.

In the surfactant of the present invention, there exist many methyl (CH$_3$—) branches in a hydrophobic group, for example, an isostearyl group. These many methyl branches are considered to enlarge a free volume of the hydrophobic tail to accelerate solvation with small carbon dioxide molecules. Furthermore, the isostearyl group has a large number of carbon atoms such as 18 in a hydrocarbon moiety thereof and exists in a mass as one hydrophobic chain, so that the isostearyl group has satisfactory hydrophobicity in comparison with TMN-6 (having a number of carbons of 12 in a hydrocarbon moiety) and AOT 4 (having a number of carbons of 9 in a hydrocarbon moiety of one chain×two chains). Accordingly, the isostearyl group is considered to have high carbon dioxide-philicity and high hydrophobicity that are required for a hydrophobic group of a surfactant for W/scCO$_2$µE in combination. On the other hand, a sulfate group that is a hydrophilic group has high hydrophilicity and a property to be never familiar with carbon dioxide (carbon dioxide-phobicity). By combining such two groups (isostearyl group and sulfuric acid group) having solvophlic and solvophobic characteristics that are entirely contrary to each other to form one surfactant molecule, the adsorption of the surfactant molecule to the water/carbon dioxide interface is strengthened. That is, it is considered that the amount of surfactant molecules dissolved in the aqueous phase and in the carbon dioxide phase is reduced and the amount of surfactant molecules adsorbed to the interface between the two phases is increased, so that property of efficiently dispersing water in carbon dioxide is imparted. In addition, such a surfactant molecule has a hydrophobic group that is extremely bulky relative to the hydrophilic group, so that the surfactant molecule stabilizes a molecular packing in a reversed micelle (a micelle in which the hydrophilic group faces inwards and the hydrophobic group faces outwards and that is an important molecular aggregate for maintaining W/scCO$_2$µE) form.

It is deduced that by the above-described actions, sodium isostearylsulfate achieves, in spite of being a hydrocarbon-based surfactant, a formation of W/scCO$_2$µE in which a large amount of water is dispersed.

EXAMPLES

Hereinafter, the present invention is described more specifically referring to Examples that should not be construed as limiting the scope of the present invention.

Example 1

Synthesis of Surfactant

Sodium Isostearylsulfate ($C_{18}H_{37}OSO_3Na$)

Into a 100 mL eggplant-shaped flask, 5.32 g (19.7 mmol) of isostearyl alcohol (manufactured by Nissan Chemical Industries, Ltd., trade name: FINEOXOCOL 180, grade: FO-180) and 3.79 g (23.8 mmol) of sulfur trioxide/pyridine complex (manufactured by Acros Organics Co.) were charged and thereto, 30.0 mL of pyridine (manufactured by Kanto Chemical Industry Co., Ltd.) was added to dissolve the content of the flask, followed by stirring the resultant reaction solution at 50° C. for 10 hours. Next, while cooling the reaction solution with ice water, to the reaction solution, 20.0 mL of a sodium hydrogen carbonate aqueous solution (prepared by dissolving a reagent powder manufactured by Wako Pure Chemical Industries, Ltd. in 20 mL of water: 1.84 mol/L) was added and then, the resultant reaction solution was stirred at 50° C. for 10 minutes.

Then, the reaction solution was transferred into a separatory funnel and thereto, a saturated saline solution (40 mL) as an aqueous phase and 1-butanol (manufactured by Wako Pure Chemical Industries, Ltd., 40 mL) as an organic phase were added, followed by separating the organic phase. Then, the operation of adding 40 mL of 1-butanol to the remaining aqueous phase and separating the organic phase was repeated for three times to extract the reaction product. Next, it was confirmed using a pH test paper that the aqueous phase is alkaline and then, calcium sulfate (manufactured by W. A. HAMMOND DRIERITE CO., LTD., DRIERITE [registered trade mark], 10 to 20 mesh) for dehydration was added to the organic phase, followed by filtering off calcium sulfate. The resultant filtrate was concentrated under reduced pressure and at each time when a solid (NaCl) was deposited, the solid was filtered off to continue the concentration under reduced pressure. Then, the reaction product was purified for three times by column chromatography using a silica gel (manufactured by Kanto Chemical Industry Co., Ltd., silica gel 60 (sphere-shaped), particle diameter 63 to 210 μm) vacuum-dried at 80° C. and an eluting solvent (ethanol (manufactured by Wako Pure Chemical Industries, Ltd.):hexane (manufactured by Wako Pure Chemical Industries, Ltd.)=1:10) dehydrated by calcium sulfate beforehand to obtain 1.77 g (yield: 24.2%) of sodium isostearylsulfate of Formula (8):

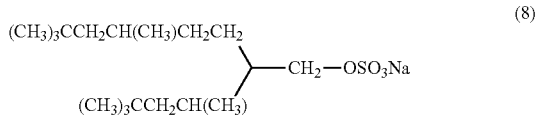
(8)

which is the objective product.

About 50 mg of sodium isostearylsulfate that is a reaction product was precisely weighed on a quartz dish, was heated (first time: at 350° C. for about 5 minutes, second time: at 450° C. for about 5 minutes, and third time: at 540° C. for about 10 minutes) on a hot plate, and was left to be cooled down. Thereto, 50 μL of sulfuric acid (manufactured by Kanto Chemical Industry Co., Ltd., EL grade) was added and the resultant reaction mixture was heated on a hot plate in the same manner as described above to be subjected to a white smoke treatment, was subjected to a heating treatment in an electric oven at 600° C. for about 60 minutes, and was left to be cooled down. Thereto, 1 mL of nitric acid (manufactured by Kanto Chemical Industry Co., Ltd., EL grade) and an appropriate amount of pure water were added and the resultant reaction mixture was heated at 200° C. on a hot plate to elute the sodium isostearylsulfate, followed by diluting the eluate with pure water to 50 mL using a digi-tube. The Na content of the diluted eluate was analyzed by an ICP-OES apparatus (manufactured by Seiko Instruments Inc.; Vista-PRO) and was calculated using a calibration curve prepared by a solution prepared beforehand by diluting a sodium ion standard solution (manufactured by Wako Pure Chemical Industries, Ltd., for ion chromatography (Na ion: 1,000 mg/L)). The Na content of sodium isostearylsulfate as the reaction product that was obtained as an average value of quantitative analyses of several times was 5.3% by weight (theoretical value: 6.2% by weight).

Example 2

Phase Behavior Observation–1 of Water/Supercritical Carbon Dioxide/Sodium Isostearylsulfate Mixture A variable-volume high-pressure cell (manufactured by Tamaseiki Ind. Co. Ltd., inner diameter: 24 mm) equipped with a window through which the inside is visible was assembled as an apparatus as illustrated in FIG. 1 and by using the apparatus, the phase behavior observation of the water/supercritical carbon dioxide/sodium isostearylsulfate mixture was performed.

Into a piston front part (window side) in the variable-volume high-pressure cell, 0.143 g (0.386 mmol) of sodium isostearylsulfate (containing 13.9% of isostearyl alcohol as an impurity) obtained in Example 1 was charged and the apparatus was closed tightly, followed by drying the inside of the variable-volume high-pressure cell using a vacuum pump. Next, the temperature of the variable-volume high-pressure cell was set at 35° C. and into the piston front part of the variable-volume high-pressure cell, 20 g (sodium isostearylsulfate concentration (relative to carbon dioxide): 0.08% by mol) of carbon dioxide (manufactured by Nippon Ekitan Corporation; purity: 99.99% or more) was pressed. Then, the temperature inside of the variable-volume high-pressure cell was elevated to 75° C. and the pressure in the mixture was elevated to 34.3 MPa (350 kgf/cm$^2$) by increasing backside pressure of the piston. The mixture was stirred for 12 hours to dissolve sodium isostearylsulfate in carbon dioxide and then it became a transparent homogeneous phase. Here, the pressure of mixture is tuned by changing backside $CO_2$-pressure of the piston of the variable-volume high-pressure cell.

As the pressure of the homogeneous mixture lowered, a turbid phase appeared at phase boundary pressure, at which the surfactant started to be deposited on decreasing pressure. The boundary pressure was measured visually at temperatures from 75° C. to 35° C. every 10° C. Here, the phase boundary pressure in this state is a critical pressure under which 0.08% by mol of sodium isostearylsulfate can be dissolved in carbon dioxide.

Then, after the measurements of the phase boundary pressures at temperatures from 75° C. to 35° C., 40 μL of water was introduced into the mixture by using a six-ports valve with a sample loop (inner volume 20 μL), and stirred at 75° C. under 34.3 MPa (350 kgf/cm$^2$) until a transparent homogeneous phase was obtained again.

If a transparent homogeneous phase reappeared, phase boundary pressures were measured at the same temperature condition as described above. The measurements of phase boundary pressures at constant $W_0$ (raw water-to-surfactant molar ratio in the mixture) and then further loading of 40 μL of water in the mixture were repeated until the homogeneous phase was not formed at pressure <400 bar and temperatures 35-75° C. When total amount of water in the mixture is higher than the solubility in $scCO_2$, the homogeneous phase is a microemulsion phase and a cloudiness phase appearing due to lowering of the pressure is a macroemulsion phase. The phase boundary pressure refers to the pressure of the boundary between these phases.

Figure 2:
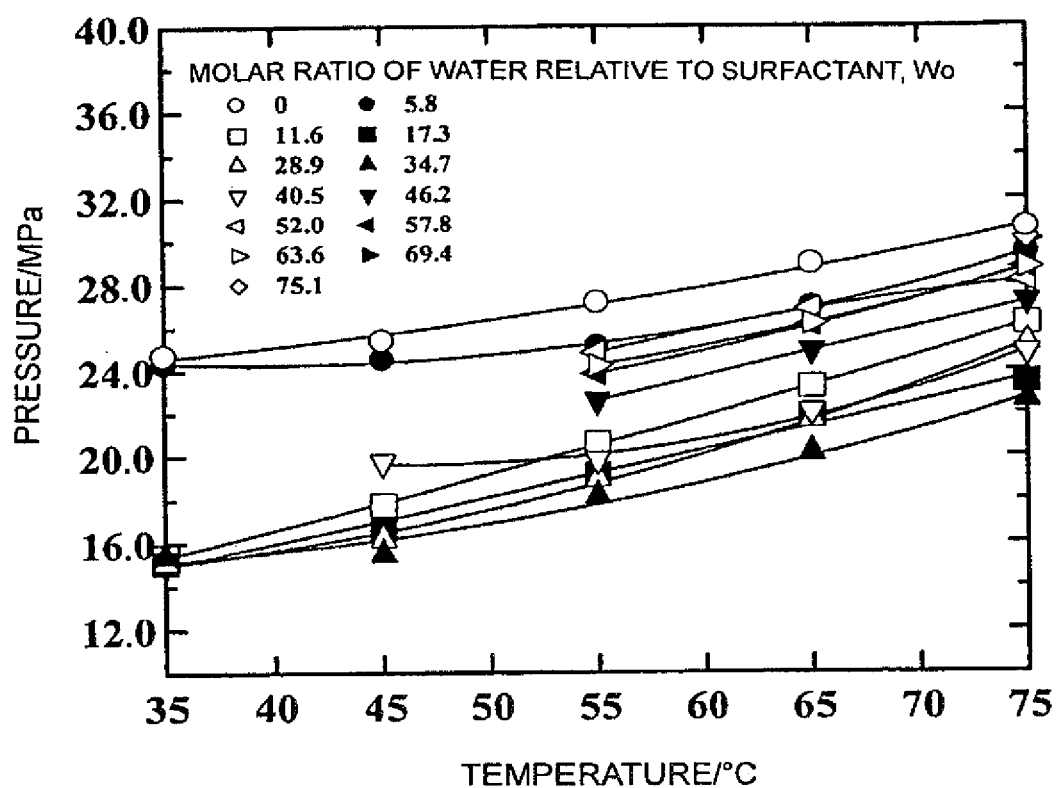
FIG. 2 is a graph illustrating a relationship between the phase boundary pressure and the temperature at each $W_0$ obtained in Example 2.

The phase boundary pressures at each $W_0$ are summarized in Table 1 and plotted as a function of temperature as shown in FIG. 2. Under the condition that $W_0$ is larger than 75.1, in a temperature range of 35 to 75° C. and a pressure range of 40 MPa or less, visual observation confirmed not transparent homogenous $W/scCO_2\mu E$ phase but two-phase with excess water separated from $CO_2$.

Figure 3:
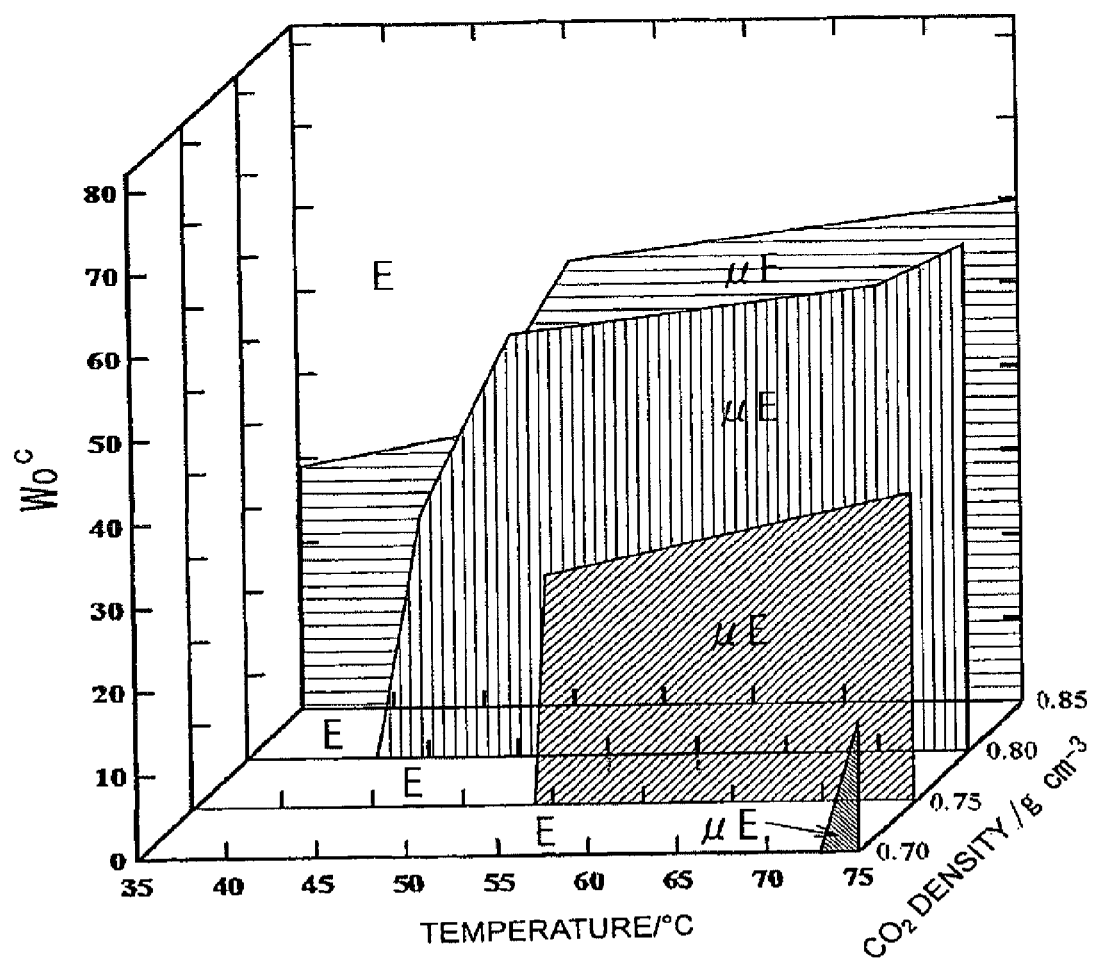
FIG. 3 is a phase diagram of a water/supercritical carbon dioxide/sodium isostearyl sulfate mixture obtained in Example 2 that illustrates a relationship of $W_0^c$ relative to the temperature and the density of the supercritical carbon dioxide.

FIG. 3 shows $W_0^c$, temperature, and $CO_2$ density conditions to yield a transparent homogeneous $W/scCO_2\mu E$ phase as a phase diagram of a water/supercritical carbon dioxide/sodium isostearyl sulfate mixture. Here, $W_0^c$ is a molar ratio of water that 1 mol of sodium isostearylsulfate can disperse in supercritical carbon dioxide and is a value remaining after subtracting a number of moles of water capable of being dissolved in supercritical carbon dioxide from $W_0$. μE expressed in FIG. 3 means a microemulsion and in a region indicated by μE, the formation of a microemulsion was confirmed. In other regions indicated by E, a macroemulsion phase or two-phase with excess water separated from $CO_2$.

TABLE 1

Relationship between phase boundary pressure and temperature at each $W_0$

| Temperature/ | Pressure/MPa Amount of water (μL)/molar ratio ($W_0$) of water relative to surfactant | | | | | | |
|---|---|---|---|---|---|---|---|
| °C. | 0/0 | 40/5.8 | 80/11.6 | 120/17.3 | 200/28.9 | 240/34.7 | 280/40.5 |
| 75 | 30.06 | 29.42 | 26.18 | 23.44 | 25.20 | 22.56 | 24.81 |
| 65 | 28.93 | 26.97 | 23.24 | 21.87 | 21.67 | 20.10 | 22.06 |
| 55 | 27.16 | 25.11 | 20.59 | 19.12 | 18.93 | 18.14 | 19.81 |
| 45 | 25.40 | 24.52 | 17.75 | 16.67 | 16.18 | 15.49 | 19.71 |
| 35 | 24.71 | 24.32 | 15.40 | 15.10 | 15.10 | 15.40 | x |

| Temperature/ | Pressure/MPa Amount of water (μL)/molar ratio ($W_0$) of water relative to surfactant | | | | | |
|---|---|---|---|---|---|---|
| °C. | 320/46.2 | 360/52.0 | 400/57.8 | 440/63.6 | 480/69.4 | 520/75.1 |
| 75 | 27.16 | 28.15 | 28.73 | 28.73 | 30.01 | 30.11 |
| 65 | 24.91 | 26.87 | 26.09 | 26.18 | x | x |
| 55 | 22.56 | 24.81 | 23.83 | 24.22 | x | x |
| 45 | x | x | x | x | x | x |
| 35 | x | x | x | x | x | x | x: indicates that microemulsion was not formed.

As shown in Table 1, in a pressure range of 40 MPa or less, sodium isostearylsulfate as a surfactant can highly form a microemulsion such that $W_0$=34.7 (15.40 MPa) at 35° C., $W_0$=40.5 (19.71 MPa) at 45° C., $W_0$=63.6 (24.22 MPa) at 55° C., $W_0$=63.6 (26.18 MPa) at 65° C., and $W_0$=75.1 (30.11 MPa) at 75° C. Usually, the microemulsion forming ability of the surfactant in supercritical carbon dioxide is expressed by $W_0^c$ that is a value remaining after subtracting an amount of water dissolved in carbon dioxide from $W_0$, a value subtracted from $W_0$ is to around 15, so that it can be mentioned that the microemulsion forming ability of sodium isostearylsulfate that is the surfactant of the present invention is extremely high in comparison with TMN-6 ($W_0^c$=around 20) that is a publicly known hydrocarbon-based surfactant. In FIG. 3, as a relationship of $W_0^c$ relative to the temperature and the density of supercritical carbon dioxide, a phase diagram of a water/supercritical carbon dioxide/sodium isostearylsulfate mixture is illustrated, actually to a region in which $W_0^c$ is high, that is, in a further wide region, the formation of the microemulsion phase is confirmed, so that it can be mentioned that the surfactant of the present invention has a microemulsion forming ability higher than that of the surfactant (TMN-6).

Example 3

Phase Behavior Observation-2 of Water/Supercritical Carbon Dioxide/Sodium Isostearylsulfate Mixture In the same manner as in Example 2, using the apparatus assembled as illustrated in FIG. 1, the phase behavior observation of a water/supercritical carbon dioxide/sodium isostearylsulfate mixture was performed. In the present system, sodium p-toluenesulfonate was used as the marker.

Into a piston front part (window side) in the variable-volume high-pressure cell, 0.143 g (0.386 mmol) of sodium isostearylsulfate (containing 13.9% of isostearyl alcohol as an impurity) obtained in Example 1 was charged and the apparatus was closed tightly, followed by drying the inside of the variable-volume high-pressure cell using a vacuum pump. Next, the temperature inside of the variable-volume high-pressure cell was set at 35° C. and into the piston front part of the variable-volume high-pressure cell, 20 g (sodium isostearylsulfate concentration (relative to carbon dioxide): 0.08% by mol) of carbon dioxide (manufactured by Nippon Ekitan Corporation; purity: 99.99% or more) was pressed. Then, the temperature inside of the variable-volume high-pressure cell was elevated to 75° C. and the pressure in the piston rear part of the variable-volume high-pressure cell was set to 37 MPa, followed by stirring the mixture in the variable-volume high-pressure cell to obtain a transparent and homogeneous sodium isostearylsulfate/carbon dioxide solution. Next, to the sodium isostearylsulfate/carbon dioxide solution, 40 μL of a 0.1% by weight sodium p-toluenesulfonate aqueous solution prepared by a method including: dissolving 0.0392 g of p-toluenesulfonic acid (manufactured by Wako Pure Chemical Industries, Ltd.) in 40 mL of water and neutralizing the resultant solution with sodium hydrogen carbonate (manufactured by Wako Pure Chemical Industries, Ltd.); utilizing a six-ports valve and a high pressure pump, was added as the marker solution and the resultant mixture was stirred. At the time when a homogeneous one liquid phase was obtained, an UV-Vis absorption spectrum was measured by a spectrophotometer (manufactured by Hitachi High-Technologies Corporation; U-2810) through a pressure resistant spectrum cell (manufactured by L. TEX Corporation; light path length: 10 mm) having a quartz window that was connected to the apparatus. By repeating the addition of 40 μL of a sodium p-toluenesulfonate aqueous solution, the stirring of the reaction mixture, and the measurement of the UV-Vis absorption spectrum, the data until $W_0$=86.5 ($W_0^c$=71.5) were collected.

Figure 4:
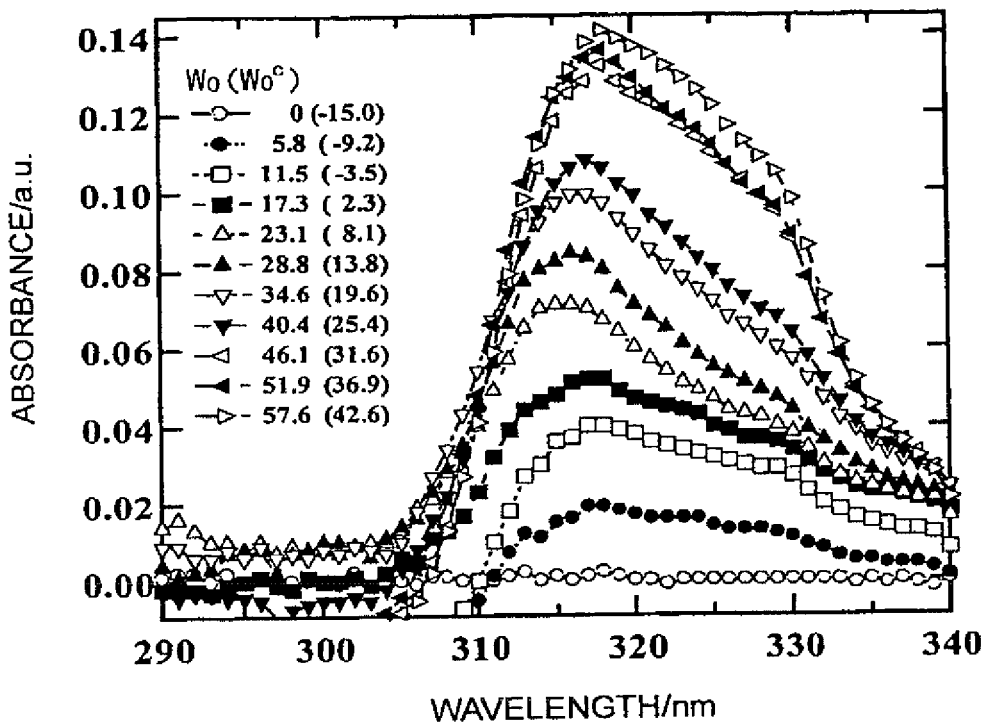
FIG. 4 is a graph illustrating an UV-Vis absorption spectrum at each $W_0$ ($W_0^c$) obtained in Example 3 ($W_0$=57.6 ($W_0^c$=42.6) or less).
Figure 5:
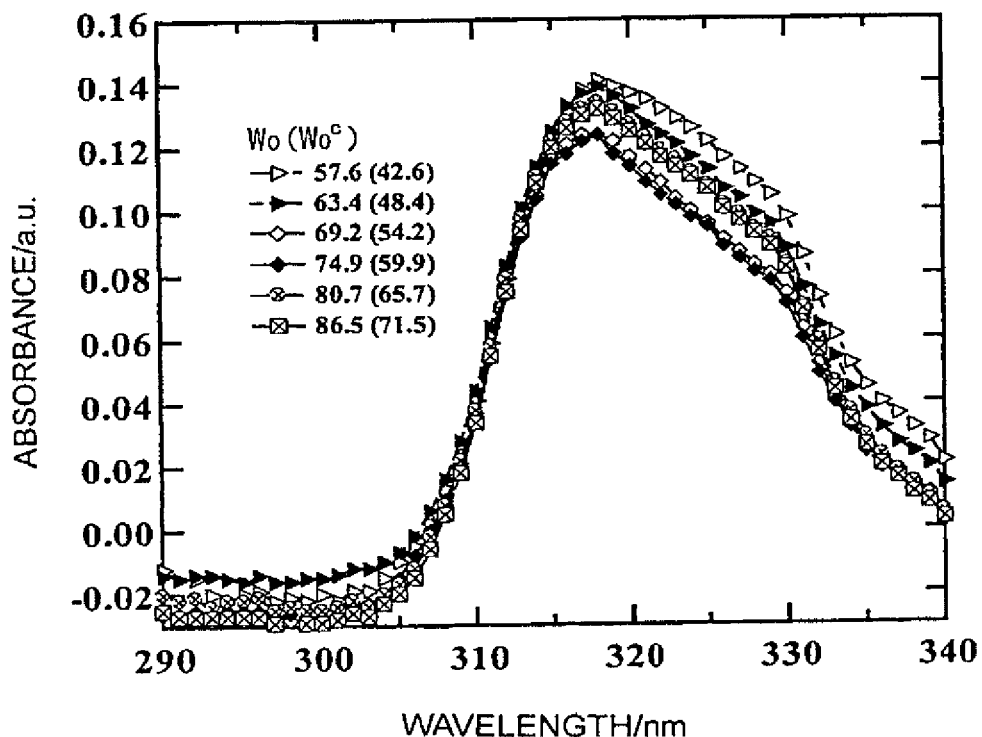
FIG. 5 is a graph illustrating an UV-Vis absorption spectrum at each $W_0$ ($W_0^c$) obtained in Example 3 ($W_0$=57.6 ($W_0^c$=42.6) or more).

FIG. 4 and FIG. 5 illustrate an UV-Vis absorption spectrum at each $W_0$ ($W_0^c$). An absorption ascribed to sodium p-toluenesulfonate was confined at 300 to 340 nm and the absorbance thereof continued to increase until $W_0$=57.6 ($W_0^c$=42.6) (FIG. 4). On the other hand, at $W_0$=57.6 ($W_0^c$=42.6) or more, the increase of the absorbance was substantially saturated and rather, there was observed a tendency to gradually decrease (FIG. 5). In the range of measured $W_0$, it was confirmed that there was formed a transparent homogeneous phase and there was visually observed no deposit.

Figure 6:
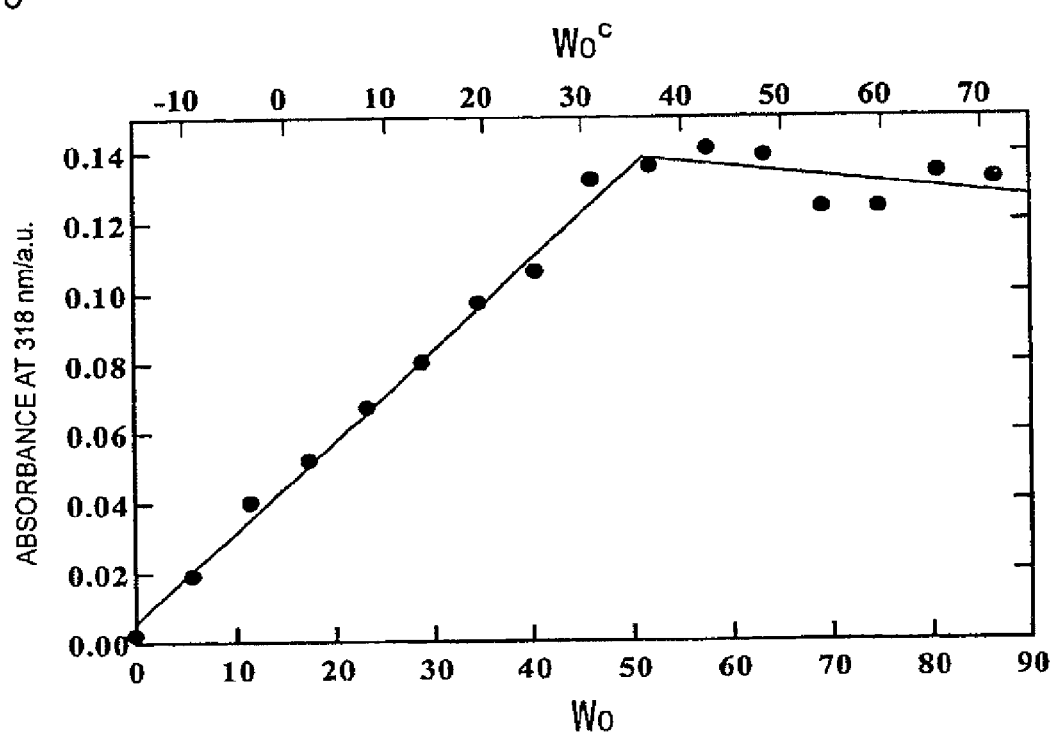
FIG. 6 is a graph illustrating an absorbance variation at 318 nm in an UV-Vis absorption spectrum relative to $W_0$ or $W_0^c$ obtained in Example 3.

FIG. 6 illustrates a variation of the absorbance at 318 nm of the UV-Vis absorption spectrum relative to $W_0$ or $W_0^c$. As described above, until $W_0$=57.6 ($W_0^c$=42.6), the increase of the absorbance was observed, so that it was confirmed that the sodium p-toluenesulfonate aqueous solution as the added marker was incorporated in the inside of the microemulsion and was dispersed in supercritical carbon dioxide. On the other hand, at $W_0$=57.6 ($W_0^c$=42.6) or more, a slow decrease of the absorbance was observed and the apparent two-phase was not visually observed, suggesting formation of a Winsor-II-type microemulsion phase. Here, the Winsor-II-type microemulsion phase refers to a phase formed by an excessive water that was not incorporated (not dispersed) in the microemulsion phase and was separated from the microemulsion.

From the above results, it is apparent that by sodium isostearylsulfate, water in an amount of $W_0^c$=around 35 can be reliably dispersed as a microemulsion and it is apparent that sodium isostearylsulfate has a microemulsion forming ability that is about 1.5 times or more that of TMN-6 ($W_0^c$=around 20) that is a publicly known hydrocarbon-based surfactant with the highest standard.

It is considered that by sodium p-toluenesulfonate as the marker, the formation of the microemulsion is destabilized and in the case where pure water is used as in Example 2, until higher $W_0^c$, the microemulsion can be formed.

INDUSTRIAL APPLICABILITY

The water/supercritical carbon dioxide microemulsion formed by the surfactant of the present invention is expected to be applied to various fields such as the synthesis of a fine particle or a nano capsule, dry cleaning, and extraction of useful substances such as metal ions and proteins. Accordingly, the surfactant of the present invention is industrially extremely advantageous.

DESCRIPTION OF THE REFERENCE NUMERALS

1: Personal computer
2: CCD camera
3: Spectrophotometer
4: Pump
5: Six-ports valve+25 μL sample loop
6: Variable-volume high-pressure cell
7: Window
8: Stirrer
9: Movable piston
10: Pressure gauge
11: Screw cylinder
12: $CO_2$ cylinder

The invention claimed is:

1. A water/supercritical carbon dioxide microemulsion including a surfactant comprising:

a sulfate compound of Formula (1):

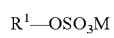 (1)

where $R^1$ is any one of groups of Formula (2) to Formula (7):

 (2)

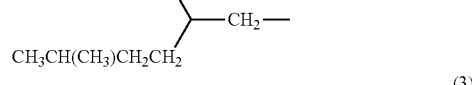 (3)

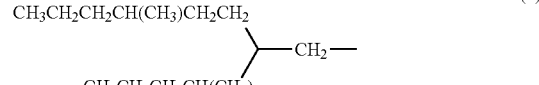 (4)

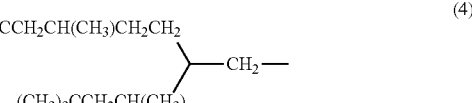 (5)

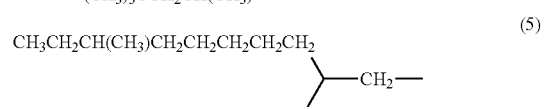 (6)

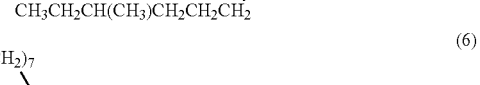 (7)

and

M is a hydrogen atom, an alkali metal, ammonium, a basic amino acid residue, an alkanolamine residue having a $C_{2-3}$ hydroxyalkyl group, or an aliphatic alkanolammonium; wherein the concentration of the surfactant is in a range of from $10^{-10}$% by mole to $10^2$% by mole based on the number of moles of carbon dioxide.

2. The water/supercritical carbon dioxide microemulsion of claim 1, wherein $R^1$ is a group of Formula (4).

3. The water/supercritical carbon dioxide microemulsion of claim 1, wherein M is an alkali metal.

4. A water/supercritical carbon dioxide microemulsion including a surfactant comprising:

a sulfate compound of Formula (1):

 (1)

where $R^1$ is any one of groups of Formula (2) to Formula (7):

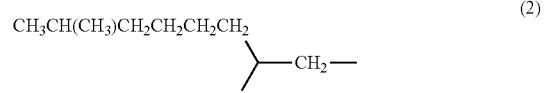 (2)

 (3)

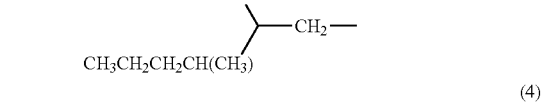 (4)

-continued

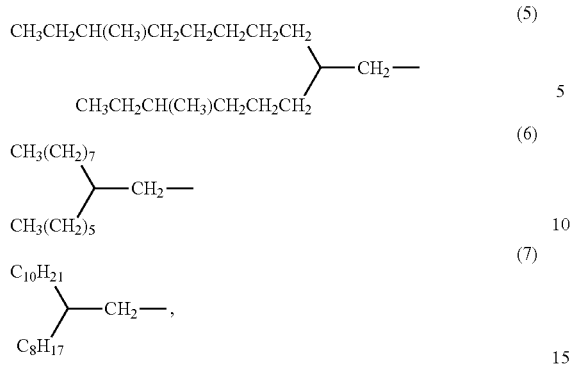

and

M is a hydrogen atom, an alkali metal, ammonium, a basic amino acid residue, an alkanolamine residue having a $C_{2-3}$ hydroxyalkyl group, or an aliphatic alkanolammonium; wherein a molar ratio of water relative to 1 mole of the surfactant at a temperature of 75° C. under a pressure of 30 MPa is in a range of from 0.001 to 1,000.

5. The water/supercritical carbon dioxide microemulsion of claim 4, wherein $R^1$ is a group of Formula (4).

6. The water/supercritical carbon dioxide microemulsion of claim 4, wherein M is an alkali metal.

* * * * *